(12) United States Patent
Antona et al.

(10) Patent No.: US 7,848,656 B2
(45) Date of Patent: Dec. 7, 2010

(54) METHOD OF OPERATING AND OPTIMISING A WDM TRANSMISSION SYSTEM AND COMPUTER PROGRAM PRODUCT

(75) Inventors: Jean-Christophe Antona, Montrouge (FR); Bruno Lavigne, Antony (FR)

(73) Assignee: Alcatel, Paris (FR)

( * ) Notice: Subject to any disclaimer, the term of this patent is extended or adjusted under 35 U.S.C. 154(b) by 673 days.

(21) Appl. No.: 11/733,161

(22) Filed: Apr. 9, 2007

(65) Prior Publication Data

US 2007/0286606 A1 Dec. 13, 2007

(30) Foreign Application Priority Data

May 8, 2006 (EP) .................... 06290921

(51) Int. Cl.
*H04B 10/12* (2006.01)
*H04B 10/08* (2006.01)
*H04B 17/00* (2006.01)

(52) U.S. Cl. .......................... 398/147; 398/29; 398/159
(58) Field of Classification Search .................. 398/29, 398/147, 148, 149, 150, 159
See application file for complete search history.

(56) References Cited

U.S. PATENT DOCUMENTS 5,717,510 A * 2/1998 Ishikawa et al. ............ 398/199
6,889,347 B1 5/2005 Adams et al.
2004/0114936 A1 * 6/2004 Sugihara et al. ............ 398/147

FOREIGN PATENT DOCUMENTS

EP 1365529 A2 11/2003
EP 1431785 A1 6/2004

* cited by examiner

*Primary Examiner*—Nathan M Curs
(74) *Attorney, Agent, or Firm*—Carmen Patti Law Group, LLC

(57) ABSTRACT

A method of operating a WDM transmission system with at least one transmitter and at least one receiver connected by means of a dispersive transmission line. The proposed method comprises the successive steps of successively: a) setting a tunable dispersion pre-compensation value at a transmitter-side Tunable Dispersion Compensation Module in operative connection with the transmitter to a first predetermined value (PRE°); b) setting or adjusting a tunable dispersion post-compensation value at a receiver-side Tunable Dispersion Compensation Module (7) in operative connection with the receiver to a second value (POST°) in order to optimize at least one characteristic (monitored performance like BER, eye opening, Q factor BER) of a transmitted signal at the receiver; and then c) simultaneously tuning the transmitter-side Tunable Dispersion Compensation Module and the receiver-side Tunable Dispersion Compensation Module with opposite respective dispersion shifts in order to further optimize said characteristic of the transmitted signal.

8 Claims, 1 Drawing Sheet

METHOD OF OPERATING AND OPTIMISING
A WDM TRANSMISSION SYSTEM AND
COMPUTER PROGRAM PRODUCT

The invention is based on a priority application EP 06 290 921.3 which is hereby incorporated by reference.

TECHNICAL FIELD

The present invention relates to a method of operating a WDM transmission system with at least one transmitter and at least one receiver connected by means of a dispersive transmission line.

BACKGROUND OF THE INVENTION

The present invention also relates to a method of optimising an existing WDM transmission system with at least one transmitter and at least one receiver connected by means of a dispersive transmission line for operation at a higher bit rate.

Furthermore, the present invention relates to a computer program product for use in a WDM transmission system with at least one transmitter operatively connected with a transmitter-side Tuneable Dispersion Compensation Module (TDCM) and at least one receiver operatively connected with a receiver-side TDCM, and with at least one data processing means adapted to control dispersion compensation values of said TDCMs.

Optical Wavelength Division Multiplex (WDM) transmission systems are highly impaired by the combined effects of dispersion and Kerr non-linearities. In this context, dispersion management is usually employed to mitigate such impairments. Dispersion management involves placing Dispersion Compensation Modules (DCM) along the transmission line in order to control total cumulated dispersion as well as dispersion compensation distribution, which has an impact on non-linear impairments.

Nowadays, optical WDM transmission systems operating at 2,5 and 10 Gbit/s are widely used. However, in the near future 40 Gbit/s systems and/or systems operating at even higher bit rates are about to be deployed. The corresponding issue of system migration to higher bit rates particularly involves dispersion management, the constraints of which are rather tight at bit rates of 40⁺ Gbit/s. Furthermore, system migration to higher bit rates generally requires modified dispersion management solutions, since a dispersion map optimised for 10 Gbit/s generally will not be compatible with 40 Gbit/s even though total cumulated dispersion is well adjusted. In addition, inline trade-offs, such as pre-compensation, inline compensation or the like, also change in connection with system migration.

When designing a new, so-called "green field" high bit rate system, e.g. for operation at 40 Gbit/s, one can design a specific dispersion map for said system and use tuneable DCMs (Tuneable Dispersion Compensation Module— TDCM) and/or electronic compensation devices to adjust cumulated dispersion at system installation and live system fluctuations due to temperature effects during operation.

When migrating a low bit rate system to higher bit rates, it is known to add system complexity at both transmitter and receiver side to generate adapted advanced modulation formats that can be operated while preserving the dispersion map originally designed for the lower bit rate. However, this is possible only if the transmission length is not too long. Furthermore, the use of complex modulation formats adapted to the transmission line by means of electrical/optical devices has proved very costly.

SUMMARY OF THE INVENTION

It is the object of the present invention to provide methods of the above-identified kind, which can be used to improve performance of an optical WDM transmission system, in particular for upgrading the system to operation at higher bit rates, in a cost-effective way.

According to a first aspect of the present invention the object is achieved by providing a method of operating a WDM transmission system with at least one transmitter and at least one receiver connected by means of a dispersive transmission line, said method comprising the steps of successively:
  a) setting a tuneable dispersion pre-compensation value at a transmitter-side Tuneable Dispersion Compensation Module (TDCM) in operative connection with the transmitter to a first predetermined value (PRE°);
  b) setting or adjusting a tuneable dispersion post-compensation value at a receiver-side TDCM in operative connection with the receiver to a second value (POST°) in order to optimise at least one characteristic of a transmitted signal at the receiver; and
  c) simultaneously tuning the transmitter-side TDCM and the receiver-side TDCM with substantially opposite respective dispersion shifts in order to further optimise said characteristic of the transmitted signal.

According to a second aspect of the present invention the object is achieved by providing a method of optimising an existing WDM transmission system with at least one transmitter and at least one receiver connected by means of a dispersive transmission line for operation at higher bit rate, said method comprising the steps of successively:
  a) providing at least one first Tuneable Dispersion Compensation Module (TDCM) in operative connection with the at least one transmitter for pre-compensating a transmitted signal;
  b) setting a tuneable dispersion pre-compensation value at the first TDCM to a first predetermined value;
  c) providing at least one second TDCM in operative connection with the at least one receiver for post-compensating the transmitted signal received at the at least one receiver;
  d) setting or adjusting a tuneable dispersion post-compensation value at the second TDCM to a second value in order to optimise at least one characteristic of a transmitted signal at the receiver; and
  e) simultaneously tuning the first and the second TDCM with substantially opposite respective dispersion shifts in order to further optimise said characteristic of the transmitted signal.

According to a third aspect of the present invention the object is achieved by providing a computer program product for use in a WDM transmission system with at least one transmitter operatively connected with a transmitter-side Tuneable Dispersion Compensation Module (TDCM) and at least one receiver operatively connected with a receiver-side TDCM, and with at least one data processing means adapted to control dispersion compensation values of said TDCMs, said computer program product comprising program code sequences adapted to successively:
  a) set a tuneable dispersion pre-compensation value at the transmitter-side TDCM to a first predetermined value;
  b) set or adjust a tuneable dispersion post-compensation value at the receiver-side TDCM in to a second value in order to optimise at least one characteristic of a transmitted signal at the receiver; and c) simultaneously tune the transmitter-side TDCM and the receiver-side TDCM with substantially opposite respective dispersion shifts in order to further optimise said characteristic of the transmitted signal, when executed on said data processing means.

Thus, according to a basic idea underlying the present invention the latter proposes to equip transponders used in WDM transmission systems with Tuneable Dispersion Compensation Modules (TDCM) on both transmitter and receiver sides—if necessary—and then adjust said TDCMs as described above in order to optimise system performance over an already installed transmission link, such that no modification of an existing transmission line is necessary. In this way, the proposed solution is particularly useful for upgrading existing low bit rate systems to operation at higher bit rates, e.g. 10 Gbit/s to 40+ Gbit/s migration.

In an embodiment of the method in accordance with said first aspect of the present invention step b) further comprises monitoring a residual dispersion value of the WDM transmission system on the receiver side, and step c) further comprises tuning the TDCMs in order to substantially maintain the residual dispersion value.

In a further embodiment of the method in accordance with said first aspect of the present invention step c) further comprises:
  measuring said characteristic of the received signal on the receiver side;
  tuning the receiver-side TDCM in accordance with said characteristic; and
  remotely controlling tuning the transmitter-side TDCM in accordance with said characteristic of the received signal.

Preferably, a control plane and/or supervisory channels are used for remotely controlling the transmission-side TDCM.

In yet another embodiment of the method according to said first aspect of the present invention said characteristic to be optimised is a Bit Error Ratio (BER), and step b) comprises minimising the BER. In this context, information concerning the BER can be derived either from Forward Error Correction (FEC) information by means of a suitable FEC decoder or by means of an eye monitor monitoring eye diagram distortions.

Alternatively or additionally, in a further embodiment of the method in accordance with the present invention said characteristic to be optimised is a Q factor, and step b) comprises maximising the Q factor.

In yet another embodiment of the method in accordance with the present invention said characteristic to be optimised is an eye opening, and step b) comprises maximising the eye opening.

Optimisation achieved by means of the method in accordance with the present invention works very fast owing to its sequential nature. In other words: instead of optimising two parameters at a time, optimisation is achieved sequentially by first adjusting cumulated dispersion only and subsequently adapting pre-compensation while maintaining the already adjusted cumulated dispersion, as outlined above.

Further advantages and characteristics of the present invention can be gathered from the following description of a preferred embodiment given by way of example only with reference to the enclosed drawings. The features mentioned above as well as below can be used in accordance with the present invention either individually or in conjunction. The embodiments mentioned are not to be understood as an exhaustive enumeration but rather as examples with regard to the underlying concept of the present invention.

DETAILED DESCRIPTION OF PREFERRED EMBODIMENTS

Figure 1:
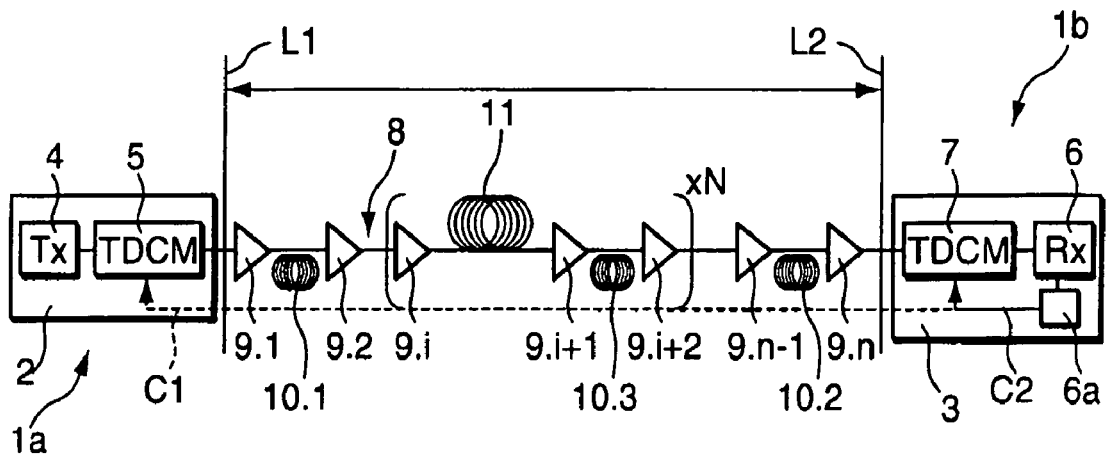
FIG. 1 is a schematic diagram of an optical WDM transmission system suitable for being operated by means of the methods in accordance with the present invention.

FIG. 1 is a schematic diagram of an optical Wavelength Division Multiplex (WDM) transmission system 1. The system 1 according to the embodiment of FIG. 1 comprises a first transponder 2 on a transmitter side 1a of the WDM transmission system 1, and a second transponder 3 on a receiver side 1b of the WDM transmission system 1. First transponder 2 comprises a transmitter 4 in operative connection with a Tuneable Dispersion Compensation Module (TDCM) 5. Second transponder 3 comprises a receiver 6 in operative connection with monitoring means 6a and with a further Tuneable Dispersion Compensation Module (TDCM) 7.

According to the embodiment shown, the transmitter 4 and the receiver 6 are connected by means of a dispersive and nonlinear optical transmission line 8, i.e. an optical fibre introducing dispersion on optical signals transmitted from the transmitter 4 to the receiver 6. The optical transmission line 8 includes a number of amplifier stages $9.1, \ldots, 9.i, \ldots, 9.n$, e.g. Optical Fibre Amplifiers (OFA). As shown in the exemplary embodiment of FIG. 1, between the first two amplifier stages 9.1, 9.2 on the transmitter side 1a of transmission system 1, there is located a fixed pre-compensation means 10.1 for compensating optical signal dispersion, e.g. in the form of a Dispersion Compensating Fibre (DCF). Likewise, between the last two amplifier stages 9.n−1, 9.n on the receiver side 1b of transmission system 1, there is located a fixed post-compensation means for compensating optical signal dispersion, e.g. in the form of another DCF 10.2.

Pre- and post-compensating means 10.1, 10.2 may not be present in alternative embodiments of the present invention.

As indicated by means of a bracket ( . . . ) symbol in FIG. 1, the optical transmission line 8 further comprises a number N of fibre spans, comprising a number of amplifiers stages 9.i-9.i+2, wherein a length 11 of dispersive optical fibre is arranged between the first two amplifier stages 9.i, 9.i+1 in each span, and wherein a further dispersion compensation means 10.3, e.g. a DCF, is arranged between the second and a third amplifier stage 9.i+1, 9.i+2 in each transmission span. As indicated in FIG. 1, the transmission line 8 together with the amplifier stages 9.1-9.n, the compensation means 10.1-10.3 and the lengths 11 of dispersive fibre form an initial transmission system devised for WDM optical signal transmission at a first bit rate, e.g. 10 Gbit/s. In FIG. 1, said initial transmission system is delimited by means of vertical lines L1, L2. Relying on fixed pre-/post-compensation as well as inline compensation by means of dispersion compensation means 10.1-10.3, said initial system has been optimised for optical signal transmission at a first bit rate, e.g. 10 Gbit/s, with acceptable optical signal dispersion.

The WDM transmission system 1 of FIG. 1 can form part of an optical network including Reconfigurable Optical Add and Drop Multiplexers (ROADMs), as known to a person skilled in the art.

By operating the WDM transmission system 1 of FIG. 1 in accordance with embodiments of the inventive method, upgrading of the initial low bit rate system to a higher bit rate system is possible without changing the configuration of transmission line 8. This is achieved by suitably controlling TDCM 5 as well TDCM 7 in accordance with received optical signal measurement data obtained at the receiver 6, as indicated by means of suitable control signal symbolised by dashed arrow C1 and solid arrow C2, respectively.

Assuming transmission line 8 being optimised for transmission of optical signals with low dispersion values at the initially low bit rate of, e.g., 10 Gbit/s, as already stated above. According to an embodiment of the present invention Tuneable Dispersion Compensating Modules 5, 7 are provided on the transmitter side 1a and the receiver side 1b of transmission system 1, respectively. By setting a tuneable dispersion pre-compensation value at TDCM 5 to a first predetermined value PRE°, e.g. equal to zero or to a pre-estimated value other than zero, first a residual dispersion of transmission system 1 is optimised by means of receiver-side TDCM 7. To this end, a tuneable dispersion post-compensation value at TDCM 7 is adaptively adjusted to a second value POST°. For to achieve this, receiver 6 is connected with monitoring means 6a for monitoring at least one characteristic of a transmitted optical signal received at receiver 6. Monitoring means 6a generate the control signal C2 for adaptively setting said tuneable dispersion post-compensation value at TDCM 7. For instance, monitoring means 6a can be devised as a Forward Error Correction (FEC) unit or as an eye monitor, such that control signal C2 can either be an FEC error signal or a signal derived from eye diagram distortions, as known to a person skilled in the art. In this context said monitored characteristic of the transmitted signal preferably is the Bit Error Ratio (BER), an eye opening, or a Q-factor.

In other words, first only the tuneable post-compensator TDCM 7 is varied, i.e. tuned to said value POST° in order to achieve optimum residual dispersion. Then, as indicated by means of control signal C1 in FIG. 1, the tuneable pre-compensation by means of TDCM 5 is optimised while maintaining the already optimised residual dispersion. According to the invention, this can be achieved by tuning the receiver-side TDCM 7 and the transmitter-side TDCM 5 simultaneously, but with substantially opposite respective dispersion shifts, such that at all times PRE+POST=PRE°+POST°, wherein PRE and POST denote respective compensation values of TDCM 5 and TDCM 7 during/after said simultaneous tuning operations. At the same time, said characteristic of the transmitted optical signal, e.g. the BER, an eye opening or a Q-factor, is continuously monitored by means of monitoring means 6a in order to continue tuning TDCM 5 and TDCM 7 simultaneously in order to achieve final optimisation of said signal characteristic, e.g. the BER, the eye opening or the Q-factor.

Advantageously, the above-described process of system optimisation works very fast, because optimisation is achieved sequentially instead of tuning two parameters at the time. In other words, the inventive approach first focuses on reducing cumulated dispersion and subsequently focuses on optimum pre-compensation.

In this way, an optimised (i.e., for low bit rate transmission) transmission link of an existing low bit rate transmission system can easily be upgraded to an optimised link for higher bit rate transmission by simply adding TDCM 5 and TDCM 7 in transponder 2 and transponder 3, respectively, without costly modification of transmission line 8.

Preferably, TDCM tuning signalling uses a control plane an/or supervisory channels (not shown) for remote controlling of pre-compensation TDCM 5 while measuring said at least one characteristic of the received signal at the receiver 6 and accordingly adapting post-compensation TDCM 7. In this way, in accordance with the above-described inventive approach, the transmission system 1 can be migrated from an initial low bit rate system to a high bit rate system while respecting four known essential features of propagation impairment mitigation:

First, the acceptable range of total cumulated dispersion is very narrow, e.g. sixteen times lower at 40 Gbit/s than at 10 Gbit/s. Second, the optimum cumulated dispersion value of a transmission line, e.g. transmission line 8 of FIG. 1, is to a good approximation the same regardless of a specific dispersion map for 40 Gbit/s and higher bit rates (cf. Frignac, Y. and Bigo, S.: "Numerical optimisation of residual dispersion in dispersion-managed systems at 40 Gbit/s", Optical Fibre Communication Conference, 2000, Vol. 1, pages 48-50). Third, dispersion management rules at 40 Gbit/s and higher bit rates ($40^+$ Gbit/s) obey to Phase-to-Intensity Conversion (PIC) minimisation rules, which means that a good choice of pre- and post-compensation DCM, respectively, may result in an essentially optimum system regardless of the inline dispersion map. This has been shown in a publication by Frignac, Y., Antona, J.-C., and Bigo, S.: "Enhanced Analytical Engineering Rule for Fast Optimisation Dispersion Maps in 40 Gbit/s-based transmission", Optical Fibre Communication Conference, 2004, Vol. 1, page 23-27). Fourth, 10 Gbit/s systems do not follow the same dispersion management rules which results in different optimised pre-compensation at low and high bit rates, respectively, e.g. 10 Gbit/s vs. $40^+$ Gbit/s. For instance, the pre-compensation value required for a 10 Gbit/s system can be different by an amount of 500 ps/nm from the one required at 40 Gbit/s for a typical transmission system using Single Mode Fibre (SMF).

In FIG. 1, a single optical transmission line 8 in operative connection with two transponders 2, 3 including one TDCM 5, 7 each has been depicted for reason of simplicity. However, as will be appreciated by a person skilled in the art, in a more complex optical network with optical nodes tuneable DCMs can be inserted in a large number of transponders or can be provided externally at add/drop ports for pre-compensation and post-compensation tuneable DCMs, respectively, for alternatively achieving per channel, band or whole multiplex compensation. Furthermore, tuneable DCMs could be provided at inputs/outputs of said optical nodes without departing from the basic idea of the present invention.

Figure 2:
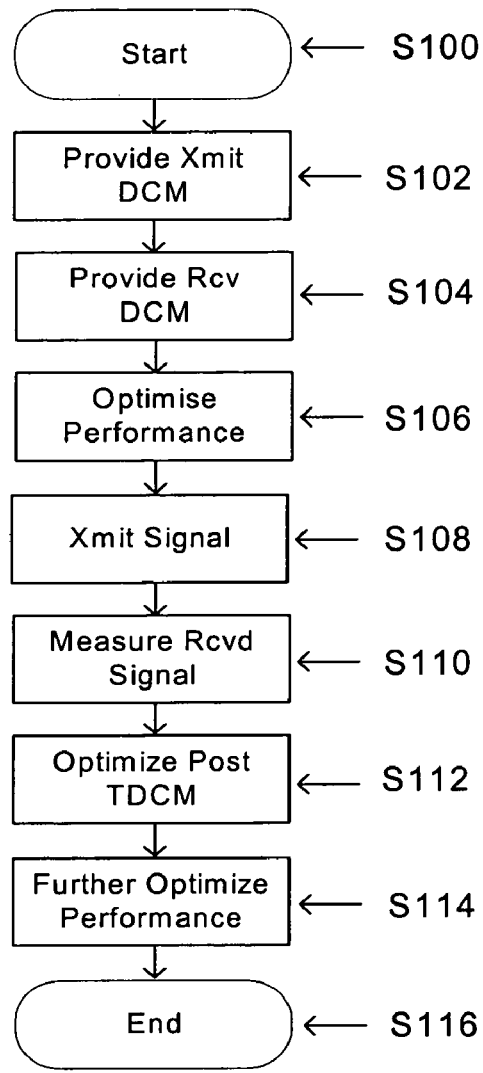
FIG. 2 is a flow chart for illustrating an embodiment of the method in accordance with the present invention.

FIG. 2 is a flow chart for illustrating an embodiment of a method in accordance with the present invention. The method starts with step S100. In case of an already existing transmission system, i.e. an pre-installed transmission line 8 (FIG. 1) with suitably optimised dispersion map for low bit rate transmission, in subsequent step S102 a tuneable DCM is provided on the transmitter side 1a (FIG. 1) of the existing transmission system, and in step S104 a further tuneable DCM is provided on the receiver side 1b of the existing transmission system, e.g. TDCMs 5, 7 of FIG. 1. Obviously, steps S102 and S104 can be left out in the case of a method for merely operating a transmission system already equipped with TDCMs on both transmitter and receiver sides.

Then, in step S106, the proposed method proceeds to easily and quickly optimise performance of the installed transmission line 8 (FIG. 1):

In step S106 the tuneable pre-compensation value of the transmitter-side TDCM is set to a first predetermined value, which can be either zero or a pre-estimated value PRE° other than zero. In subsequent step S108, an optical signal is transmitted on the transmission line, and in step S110 at least one characteristic of the transmitted signal as received on the receiver side of the system is measured. In subsequent step S112 tuning of the post-compensator TDCM is optimised to a value POST° in order to minimise said measured characteristic, e.g. the BER which can be obtained, for instance, by using FEC decoders (not shown) on the receiver side of the system. In this way, step S112 achieves establishing an optimum residual dispersion.

Then, in step S114 the tuneable pre-compensation DCM and the tuneable post-compensation DCM are tuned simultaneously with opposite dispersion shifts to further optimise system performance, for instance in terms of BER. Simultaneously tuning both DCMs with opposite dispersion shifts enables maintaining the already optimised residual dispersion (cf. step S112), since PRE+POST=PRE°+POST°, wherein PRE and POST denote respective settings of the pre-compensation TDCM and the post-compensation TDCM.

In above-described step S114, the system control plane and/or supervisory channels can advantageously be used to remote control the pre-compensation TDCM while continuously measuring/monitoring a quality of signal and adapting the post-compensation TDCM on the receiver side.

The described embodiment of the inventive method terminates with step S116.

In this way, an upgraded high bit rate transmission system can be optimised easily and quickly while solving the issue of reduced performance of an actual transmission system—in contrast to a "green field"-designed system—due to a lack of accurate knowledge with respect to the installed transmission fibres. In addition to system set-up, the same routine can be launched again, preferably continuously, during system lifetime in order to adapt the system to, e.g., temperature fluctuations, requiring at least changing post-compensation or to microscopic changes on the line (due to repair work, aging, . . . ).

Therefore, the inventive approach allows automatic and simple migration of low bit rate transmission systems, e.g. operating at relatively low bit rates of 10 Gbit/s, to higher bit rates, e.g. 40 Gbit/s. It also allows to automatically optimise the dispersion map of any transmission system roughly optimised in a first optimisation step, thus overcoming the issue of insufficient knowledge about the installed transmission fibres. Furthermore, the inventive approach avoids any modification of the previously installed system as far as dispersion map, amplifier stages or deployed transmission fibre are concerned. Only at system edges moderate modification is required (cf. steps S102, S104 of FIG. 2). Such an approach is easier to implement than full electronic signal pre-/post-distortion, which requires high processing powers and speeds, thus entailing higher costs.

The invention claimed is:

1. A method of operating a WDM transmission system with at least one transmitter and at least one receiver connected by means of a dispersive transmission line, said method comprising the steps of successively:
   a) setting a tuneable dispersion pre-compensation value at a transmitter-side Tuneable Dispersion Compensation Module in operative connection with the transmitter to a first predetermined value,
   b) setting or adjusting a tuneable dispersion post-compensation value at a receiver-side Tuneable Dispersion Compensation Module in operative connection with the receiver to a second value in order to optimise at least one characteristic of a transmitted signal at the receiver where the transmitter-side Tuneable Dispersion Compensation Module and the receiver-side Tuneable Dispersion Compensation Module are operatively coupled; and
   c) simultaneously tuning the transmitter-side Tuneable Dispersion Compensation Module and the receiver-side Tuneable Dispersion Compensation Module with substantially opposite respective dispersion shifts, such that at all times a third value+a fourth value=the first predetermined value+the second value, wherein the third value is a compensation value of the transmitter-side Tuneable Dispersion Compensation Module and the fourth value is a compensation value of the receiver-side Tuneable Dispersion Compensation Module, in order to further optimise said characteristic of the transmitted signal.

2. The method of claim 1, wherein step b) further comprises monitoring a residual dispersion value of the WDM transmission system on the receiver side, and in that step c) further comprises tuning the Tuneable Dispersion Compensation Modules in order to substantially maintain the residual dispersion value.

3. The method of claim 1, wherein step c) further comprises: measuring said characteristic of the received signal on the receiver side; tuning the receiver-side TDCM in accordance with said characteristic; and remotely controlling tuning the transmitter-side TDCM in accordance with said characteristic of the received signal.

4. The method of claim 1, wherein said characteristic to be optimised is a Bit Error Ratio, and in that step b) comprises minimising the BER.

5. The method of claim 1, wherein said characteristic to be optimised is a Q factor, and in that step b) comprises maximising the Q factor.

6. The method of claim 1, wherein said characteristic to be optimised is an eye opening, and in that step b) comprises maximising the eye opening.

7. A method of optimising an existing WDM transmission system with at least one transmitter and at least one receiver connected by means of a dispersive transmission line for operation at higher bit rate, said method comprising the steps of successively:
   a) providing at least one first Tuneable Dispersion Compensation Module in operative connection with the at least one transmitter for pre-compensating a transmitted signal;
   b) setting a tuneable dispersion pre-compensation value at the first Tuneable Dispersion Compensation Module to a first predetermined value;
   c) providing at least one second Tuneable Dispersion Compensation Module in operative connection with the at least one receiver for post-compensating the transmitted signal received at the at least one receiver;
   d) setting or adjusting a tuneable dispersion post-compensation value at the second Tuneable Dispersion Compensation Module to a second value in order to optimise at least one characteristic of the transmitted signal at the receiver where the first Tunable Dispersion Compensation Module and the second Tunable Dispersion Compensation Module are operatively coupled; and
   e) simultaneously tuning the first Tuneable Dispersion Compensation Module and the second Tuneable Dispersion Compensation Module with substantially opposite respective dispersion shifts, such that at all times a third value+a fourth value=the first predetermined value+the second value, wherein the third value is a compensation value of the first Tunable Dispersion Compensation Module and the fourth value is a compensation value of the receiver side Tunable Dispersion Compensation Module, in order to further optimise said characteristic of the transmitted signal.

8. A WDM transmission system with at least one transmitter operatively connected with a transmitter-side Tuneable Dispersion Compensation Module and at least one receiver operatively connected with a receiver-side Tuneable Dispersion Compensation Module, and with at least one data processing means adapted to control dispersion compensation values of said Tuneable Dispersion Compensation Modules, said WDM transmission system comprising program code sequences that:

a) set a tuneable dispersion pre-compensation value at the transmitter-side Tuneable Dispersion Compensation Module to a first predetermined value;

b) sets or adjust a tuneable dispersion post-compensation value at the receiver-side Tuneable Dispersion Compensation Module to a second value in order to optimise at least one characteristic of a transmitted signal at the receiver; and c) simultaneously tunes the transmitter-side Tuneable Dispersion Compensation Module and the receiver-side Tuneable Dispersion Compensation Module with substantially opposite respective dispersion shifts, such that at all times a third value+a fourth value=the first predetermined value+the second value, wherein the third value is a compensation value of the transmitter-side Tunable Dispersion Compensation Module and the fourth value is a compensation value of the receiver-side Tuneable Dispersion Compensation Module, in order to further optimise said characteristic of the transmitted signal when executed on said data processing means.

* * * * *